(12) United States Patent
Joshi

(10) Patent No.: US 8,145,750 B2
(45) Date of Patent: Mar. 27, 2012

(54) DETECTING HIDDEN SHARED DEPENDENCIES THROUGH COVERT CHANNELS

(75) Inventor: Kaustubh R. Joshi, Scotch Plains, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 756 days.

(21) Appl. No.: 12/277,012

(22) Filed: Nov. 24, 2008

(65) Prior Publication Data

US 2010/0131637 A1 May 27, 2010

(51) Int. Cl.
*G06F 15/16* (2006.01)
(52) U.S. Cl. ......... 709/224; 709/201; 709/229; 703/22; 718/1; 718/105; 718/106
(58) Field of Classification Search .................. 709/201, 709/203, 24, 229, 213–215, 219; 718/100, 718/104, 1, 102, 106, 107; 703/22
See application file for complete search history.

(56) References Cited

U.S. PATENT DOCUMENTS

| | | | | |
|---|---|---|---|---|
| 6,144,961 | A * | 11/2000 | de la Salle | 1/1 |
| 6,457,143 | B1 * | 9/2002 | Yue | 714/43 |
| 6,760,812 | B1 * | 7/2004 | Degenaro et al. | 711/133 |
| 6,874,143 | B1 * | 3/2005 | Murray et al. | 717/173 |
| 7,039,916 | B2 * | 5/2006 | Jason, Jr. | 718/105 |
| 7,389,374 | B1 * | 6/2008 | Azimi | 710/305 |

OTHER PUBLICATIONS

Towards Highly Reliable Enterprise Network Services Via Inference of Multi-level Dependencies;Paramvir Bahl, Ranveer Chandra, Albert Greenberg, Srikanth Kandula,David A. Maltz, Ming Zhang;ACM SIGCOMM Computer Communication Review vol. 37 Issue 4, Oct. 2007; pp. 1-12.*
Abstract entitled "Detecting Hidden Shared Dependencies via Covert Channels," presented at The 38th Annual IEEE/IFIP International Conference in Anchorage, Alaska, Jun. 24-27, 2008; Inventor: Kaustubh R. Joshi, 2 pages.

* cited by examiner

*Primary Examiner* — Carl Colin
*Assistant Examiner* — Mohammad Siddiqi
(74) *Attorney, Agent, or Firm* — Hope Baldauff Hartman, LLC

(57) ABSTRACT

According to one method for detecting a hidden shared dependency through covert channels, a pattern of bursts is transmitted to a first application hosted by a first server. The pattern of bursts may be designed to stress a potential hidden dependency shared by the first application and a second application hosted by a second server. Each of the bursts may include one or more concurrent requests. Probe requests are transmitted to the second application. Responses corresponding to the probe requests are received from the second application. Response times are determined by computing a difference between times that the probe requests are transmitted and times that the corresponding responses are received. A determination is made whether the potential hidden dependency exists based on the response times.

20 Claims, 5 Drawing Sheets

DETECTING HIDDEN SHARED DEPENDENCIES THROUGH COVERT CHANNELS

BACKGROUND

Distributed computing systems managed by multiple and separate administrative units are becoming increasingly common due to developing technological trends, such as utility computing and service-oriented architectures. In these and other related scenarios, it can be difficult for any single entity to obtain information about the design of an entire system. For example, design information may be withheld from certain entities in order to maintain a competitive advantage, to preserve proprietary secrets, or to comply with legal requirements.

The inability for entities to obtain design information about the entire system can result in significant design consequences. For example, when designing highly available systems, it can be critical for redundant subsystems to have independent failure modes. That is, the failure of one subsystem should not cause the failure of a redundant subsystem. However, designing such systems can be difficult without access to deployment configurations and other information for each of the subsystems. In particular, the deployment configurations may indicate any shared dependencies (e.g., resources, network elements, etc.) that can be a common point of failure. For example, although a primary web service and a backup web service may appear to be independent, the primary web service and the backup web service may actually be hosted by the same virtual web hosting provider. As a result, any shared components between the primary web service and the backup web service become hidden shared dependencies and potentially common points of failure.

One conventional approach to identifying hidden shared dependencies is examining external observables of a system. External observables may be appropriate for identifying a limited set of shared dependencies. For example, when receiving a request for a document, the server may respond with the requested document as well as header information identifying the web server (e.g., APACHE HTTP SERVER from APACHE SOFTWARE FOUNDATION or MICROSOFT IIS from MICROSOFT CORPORATION). In this case, the header information identifying the web server is referred to as an external observable. By requesting documents from two different servers, it can be determined whether the two servers utilize the same web server by comparing the associated header information. However, external observables are only effective to the extent of the information that can be provided by the servers. In particular, external observables may not be effective for determining whether two servers share the same network connection or share the same backend database.

Another conventional approach to identifying hidden shared dependencies is deduction based on known failure occurrences. By gathering a significant amount of information regarding the failures of multiple entities, deductions can be made by examining common behavior patterns between the entities. For example, if a first subsystem commonly fails at the same time a second subsystem fails, then a correlation between the failure of the first subsystem and the failure of the second system can be deduced. However, it can take a substantial amount of time to collect sufficient information, assuming this information is even available, in order to accurately determine these correlations.

SUMMARY

Embodiments of the disclosure presented herein include methods, systems, and computer-readable media for detecting a hidden shared dependency through covert channels. According to one aspect, a method for detecting a hidden shared dependency through covert channels is provided. According to the method, a pattern of bursts is transmitted to a first application hosted by a first server. The pattern of bursts may be designed to stress a potential hidden dependency shared by the first application and a second application hosted by a second server. Each of the bursts may include one or more concurrent requests. Probe requests are transmitted to the second application. Responses corresponding to the probe requests are received from the second application. Response times are determined by computing a difference between times that the probe requests are transmitted and times that the corresponding responses are received. A determination is made whether the potential hidden dependency exists based on the response times.

According to another aspect, a system for detecting a hidden shared dependency through covert channels is provided. The system includes a memory and a processor functionally coupled to the memory. The memory stores a program containing code for detecting a hidden shared dependency through covert channels. The processor is responsive to computer-executable instructions contained in the program and operative to transmit a pattern of bursts to a first application hosted by a first server, transmit probe requests to the second application, receive responses corresponding to the probe requests from the second application, determine response times by computing a difference between times that the probe requests are transmitted and times that the corresponding responses are received, and determine whether the potential hidden dependency exists based on the response times. The pattern of bursts may be designed to stress a potential hidden dependency shared by the first application and a second application hosted by a second server. Each of the bursts may include one or more concurrent requests.

According to yet another aspect, a computer-readable medium having instructions stored thereon for execution by a processor to perform a method for detecting a hidden shared dependency through covert channels is provided. According to the method, a pattern of bursts is transmitted to a first application hosted by a first server. The pattern of bursts may be designed to stress a potential hidden dependency shared by the first application and a second application hosted by a second server. Each of the bursts may include one or more concurrent requests. Probe requests are transmitted to the second application. Responses corresponding to the probe requests are received from the second application. Response times are determined by computing a difference between times that the probe requests are transmitted and times that the corresponding responses are received. A determination is made whether the potential hidden dependency exists based on the response times.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
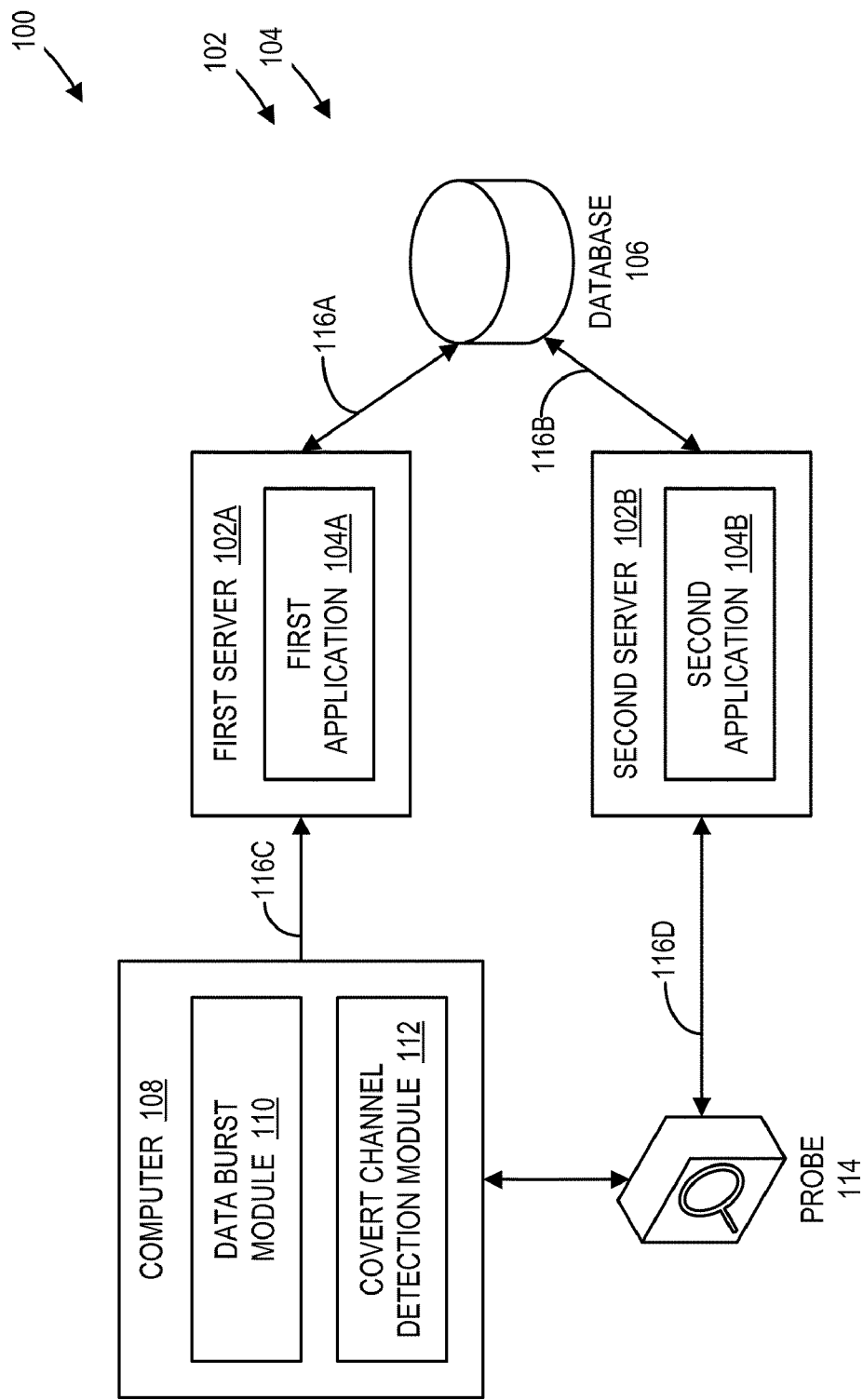
FIG. 1 depicts a network architecture operative to detect hidden shared dependencies through covert channels, in accordance with exemplary embodiments.

The following detailed description is directed to detecting hidden shared dependencies through covert channels. As used herein, a hidden dependency refers to any suitable shared resource (also referred to herein as a shared dependency) that is used by two or more seemingly independent entities. In one embodiment, the shared resource is a network resource (e.g., a communications cable, a router, a backend database, etc.) that is shared between the two or more computer-based entities. In other embodiments, the shared resource may include other suitable resources, such as a shared server, a shared disk, and other non-network resources. Each entity may be a subsystem, a single system, a collection of multiple systems.

As used herein, covert channels are unintended ways (or communication channels) in which two entities can communicate with each other by manipulating the environment. The covert channel may be caused by a shared dependency between the two entities. For example, consider two computers that share the same backend database. An increased workload on the first computer may cause the first computer to increase the number of queries to the shared database, thereby increasing the workload of the shared database. The increased workload of the shared database may increase its overall response time to respond to other queries. Thus, when the second computer queries the shared database, the response time in which the shared database responds may be greater than under a normal workload. If such unintentional changes in response times are used to communicate information between two systems, the communications channel is said to be "covert." This is because the cause of the response time changes might be entirely unknown to the systems, especially if they are operated by different entities without knowledge of the shared database.

Because a covert channel between two entities is likely caused by a shared dependency, it follows that the detection of a covert channel between the two entities may indicate a high likelihood that a shared dependency exists. Accordingly, embodiments described herein manipulate the operation of a first entity in order to attempt communication over and to detect the existence of a possible covert channel with the second entity. The first entity may be manipulated in a number of different ways in order to attempt to induce different covert channels. If a covert channel is successfully induced, then the type of covert channel that is induced may be indicative of the type of shared dependency that exists.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology for detecting shared hidden dependencies will be described. FIG. 1 shows an illustrative network architecture 100 for detecting shared hidden dependencies through covert channels. According to embodiments, the network architecture 100 includes a first server 102A and a second server 102B. The first server 102A includes a first application 104A, and the second server 102B includes a second application 104B. The first server 102A and the second server 102B are coupled to a database 106. In one embodiment, the first application 104A and the second application 104B are each operative to access the database 106. A computer 108, which includes a data burst module 110 and a covert channel detection module 112, is coupled to the first server 102A. A probe 114 is coupled to the second server 102B.

The first server 102A is coupled to the database 106 via a connection 116A, and the second server 102B is coupled to the database 106 via a connection 116B. The computer 108 is coupled to the first server 102A via a connection 116C, and the probe 114 is coupled to the second server 102B via a connection 116D. In one embodiment, the connections 116A, 116B, 116C, and 116D represent direct connections. In a further embodiment, the connections 116A, 116B, 116C, and 116D represent communications through a network, such as a network 418 illustrated in FIG. 4.

It should be appreciated that the two servers 102A and 102B (collectively referred to as servers 102), the two applications 104A and 104B (collectively referred to as applications 104), and the one database 106 are illustrated in FIG. 1 for the sake of simplicity. Other implementations may include any suitable number of servers, applications, and databases, as contemplated by those skilled in the art. In one embodiment, the applications 104 are web services or web sites. According to embodiments, the applications 104 include one or more source applications where a signal is introduced and one or more receiving applications where a signal is detected. The applications may be executed on computer systems operating a variety of different components, some of which may be shared. These components may include the servers 102, the database 106, networks, and the like.

According to embodiments, the data burst module 110 is operative to transmit synchronized bursts (also referred to as epochs) of one or more concurrent requests in a given pattern to the first application 104A in order to increase the workload on the first server 102A. The given pattern may be designed such that it is unlikely to occur under normal operation of the first application 104A and such that it also has good detection sensitivity. In particular, the given pattern may be designed to stress a potential shared dependency, such as the database 106. Each burst may be separated by a given amount of time (e.g., several milliseconds). By designing the given pattern in a way that is unlikely to occur under normal operation of the first application 104A, any outstanding effects on the first application 104A caused by the given pattern can be differentiated from the regular effects on the first application 104A under normal operation.

In one embodiment, the number of requests in each burst sent to the first application 104A is periodically fluctuated according to a square-wave waveform. In particular, the number of requests in each burst may be toggled from a low number to a high number at a given frequency f. The square-wave waveform is one way to minimize the effects of noise in each burst. However, other suitable patterns of requests may be similarly utilized. While the requests are being sent to the first application 104A, the covert channel detection module 112, through the probe 114, sends probe requests to the second application 104B. The probe requests may also be designed to stress the same potential shared dependency for which the given pattern is designed. The covert channel detection module 112, through the probe 114, then receives responses corresponding to the probe requests from the second application 104B and determines response times associated with the responses. In one embodiment, the probe requests are transmitted at a constant or near-constant rate so as to not contaminate the pattern to be detected.

Upon determining the response times, the covert channel detection module 112 constructs Fourier transforms (e.g., a fast Fourier transforms ("FFTs")) of the response times. The covert channel detection module 112 then analyzes the Fourier transforms to determine whether a frequency spike is observed at the given frequency f. If the frequency spike is observed, then the covert channel detection module 112 determines that a hidden shared dependency exists. If the frequency spike is not observed, then the covert channel detection module 112 determines that a hidden shared dependency does not exist.

By carefully considering the type of data that the data burst module 110 transmits to the first application 104A and the type of data that the probe 114 transmits to the second application 104B, different potential shared dependencies (e.g., front-end, back-end, network) can be detected. In one example, if a covert channel is detected by using CGI scripts but not large files, then the applications 104 may share an application server but not a network link. In another example, if a covert channel is detected by using requests that stress use of the database 106, then the applications 104 may share a database. Other associations between the type of data that is sent to the applications 104 and the type of shared dependency that exists may be contemplated by those skilled in the art.

Figure 2A:
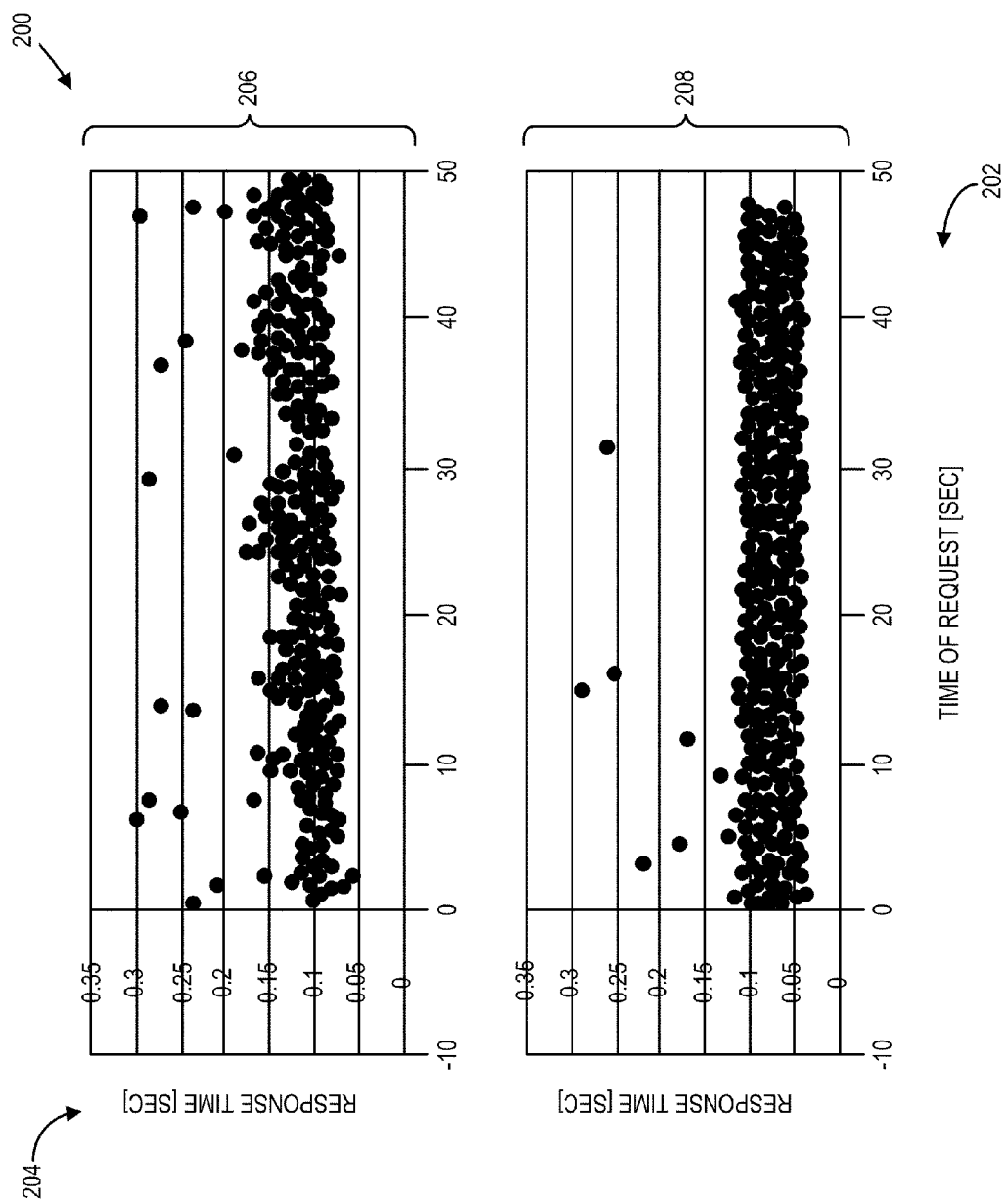
FIG. 2A is a time plot of response times based on two different patterns of bursts, in accordance with exemplary embodiments.
Figure 2B:
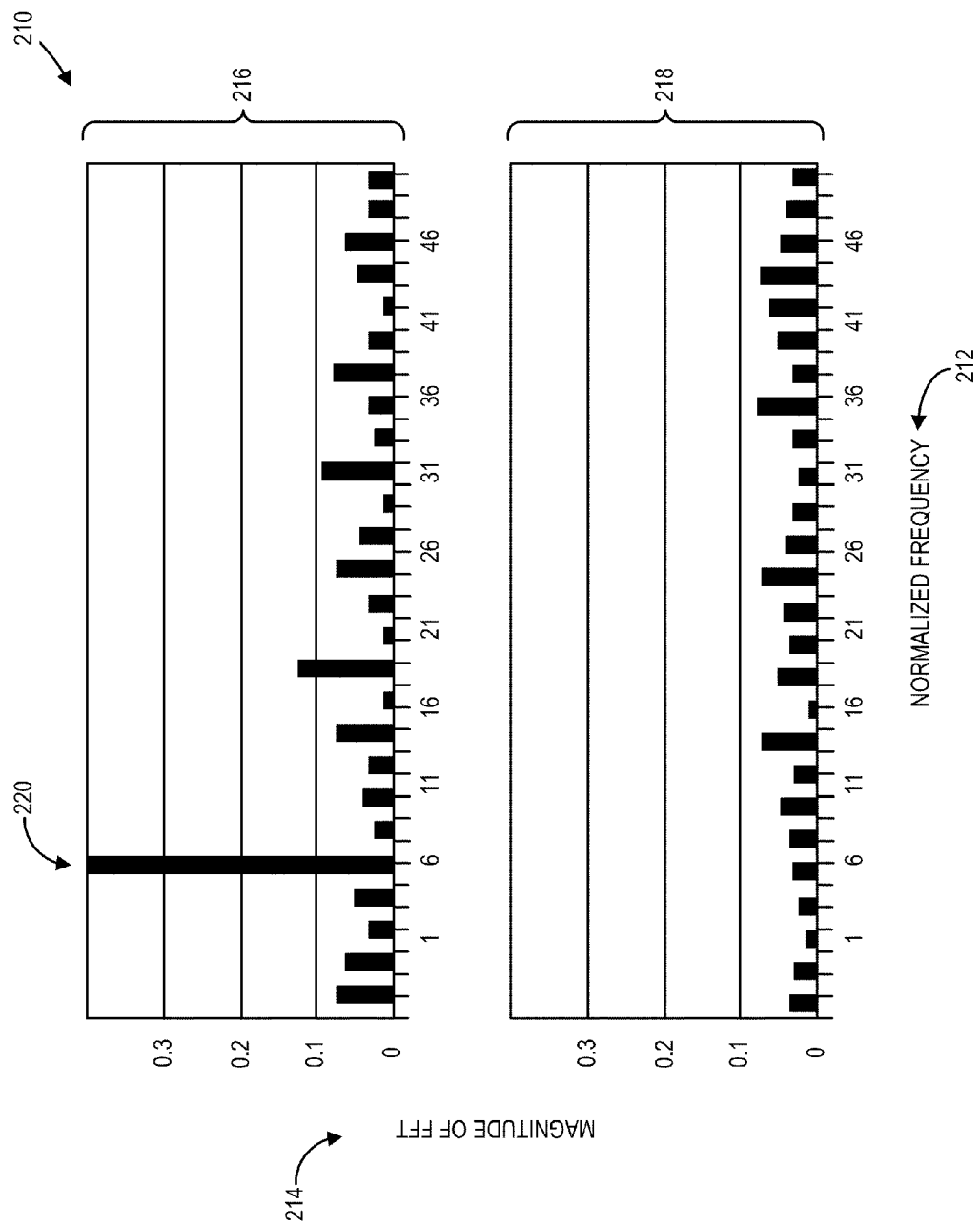
FIG. 2B is a frequency domain plot based on the time plot of FIG. 2A, in accordance with exemplary embodiments.

Referring now to FIGS. 2A and 2B, an illustrative execution of the data burst module 110, the covert channel detection module 112, and the probe 114 will be described. In particular, FIG. 2A illustrates an exemplary time plot 200 corresponding to the illustrative execution of the data burst module 110, the covert channel detection module 112, and the probe 114, and FIG. 2B illustrates an exemplary frequency domain plot 210 based on the time plot 200. In the illustrative execution, the first application 104A is the Rice University Bidding System ("RUBiS"), and the second application 104B is the Rice University Bulletin Board System ("RUBBoS").

The data burst module 110 is configured to send two different patterns of requests to the first application 104A. The first pattern of requests is designed to stress a potential hidden dependency, such as the database 106. For example, the first pattern of requests may include database-oriented requests, such as the "SearchItemsByCategory" request available on RUBiS. The second pattern of requests is designed to stress a resource that is not shared. In the illustrative execution, the first pattern and the second pattern of requests each include 100 synchronized bursts, and the number of concurrent requests in each burst is toggled between one and ten at a frequency of six cycles per pattern. The probe 114 is configured to send probe requests to the second application 104B that stress the same potential hidden dependency for which the first pattern requests is designed. For example, the probe requests may also include database-oriented requests, such as "StoriesOfTheDay" requests available on RUBBoS, in order to measure the response time of the second application 104B with respect to the database 106.

Referring now to FIG. 2A, an exemplary time plot 200 depicting raw response times of the second application 104B is illustrated. In the time plot 200, the x-axis 202 refers to a time (in seconds) when the probe 114 sends a probe request to the second application 104B, and the y-axis 204 refers to the response time (in seconds) of the second application 104B to respond to the probe request. The time plot 200 includes a first portion 206 and a second portion 208. The first portion 206 corresponds to the data burst module 110 sending the first pattern of requests to the first application 104A. The second portion 208 corresponds to the data burst module 110 sending the second pattern of requests to the first application 104A.

As shown in FIG. 2A, periodic fluctuations in the response times can be seen in the first portion 206 that are not present in the second portion 208. This result is consistent with the design of the first pattern to stress the database 106 as a potential hidden dependency. As previously discussed, the probe requests are also designed to stress the database 106 as a potential hidden dependency. Since the probe requests stress the database 106, the periodic fluctuations in the response times that can be seen in the first portion 206 that are not present in the second portion 208 are likely due to the additional workload placed on the database 106. The fluctuations however are relatively small with a difference in mean of about 5.2 milliseconds compared to a standard deviation of about 16 milliseconds. In order to more effectively analyze the time plot 202, Fourier transforms of response times in the time plot 200 may be computed.

Referring now to FIG. 2B, the frequency domain plot 210 is generated by constructing Fourier transforms of the response times in the time plot 200. In the frequency domain plot 210, the x-axis 212 refers to a normalized frequency of the first pattern and the second pattern of requests, and the y-axis 214 refers to the magnitudes of the FFTs. The frequency domain plot 210 includes a first portion 216 that corresponds to the first pattern of requests and a second portion 218 that corresponds to the second pattern of requests. As shown in FIG. 2B, the pattern that the data burst module 110 transmits to the first application 104A is clearly visible as a spike 220 at a frequency of six. The spike 220 at the frequency of six cycles is consistent with the design of the first pattern of requests as the number of concurrent requests toggles from one to ten at the frequency of six cycles. The spike 220 is more than fifty times the standard deviation of the remaining values in the frequency domain plot 210, and thus, provides a clear indication of an outstanding value in the frequency domain plot 210.

As previously described, the first pattern of requests is designed to place a greater stress on the database 106 by toggling the number of concurrent requests from one to ten at the frequency of six cycles. At this instance, the database 106 experiences a heavier workload. The heavier workload on the database 106 thereby increases the response time of the second application 104B that is also receiving database-oriented requests from the probe 114. FIG. 2B provides a clear indication at the spike 220 illustrating that database-oriented requests transmitted to the first application 104A affect the response time of the second application 104B. Based on this evidence, a determination can be made that the first application 104A and the second application 104B share a database, which in this case is the database 106.

Figure 3:
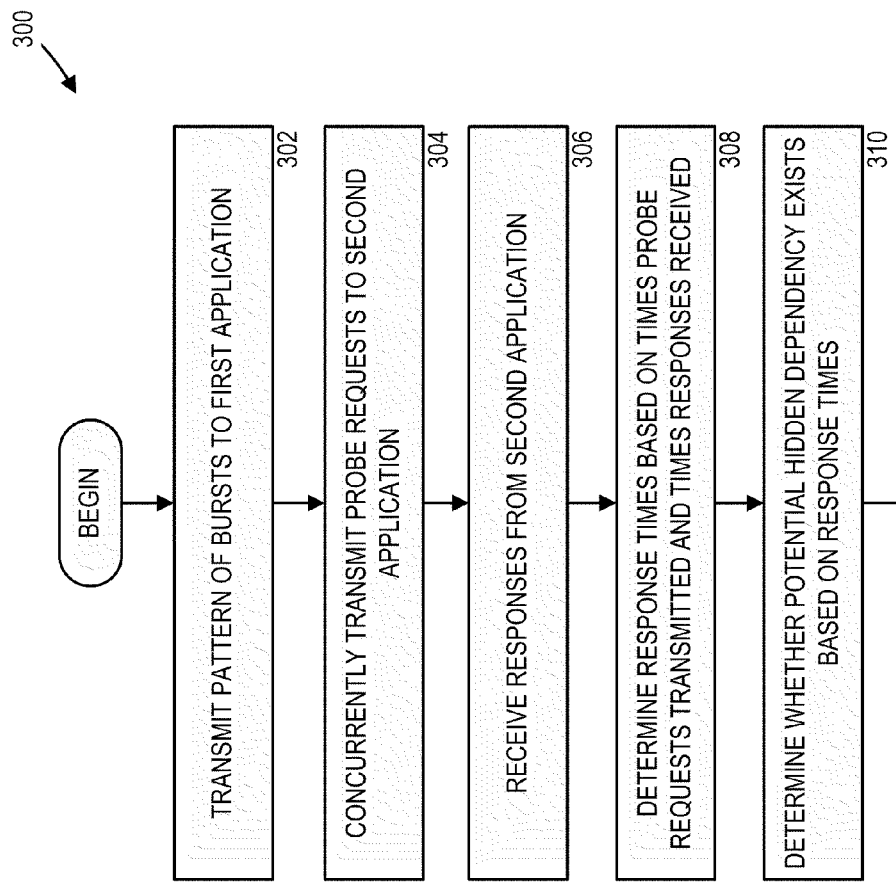
FIG. 3 is a flow diagram illustrating a method for detecting hidden shared dependencies through covert channels, in accordance with exemplary embodiments.

FIG. 3 is a flow diagram illustrating a method 300 for detecting hidden shared dependencies through covert channels, in accordance with exemplary embodiments. According to the method 300, the data burst module 110 transmits (at 302) a pattern of bursts to the first application 104A, which is hosted by the first server 102A. In one embodiment, the pattern of bursts are designed to stress a potential hidden dependency, such as the database 106, shared by the first application 104A and the second application 104B hosted by the second server 102B. Each of the bursts may include one or more concurrent requests to the first application 104A. In one embodiment, the number of requests in each of the bursts is periodically fluctuated according to a square-wave waveform. In particular, the number of requests in each of the bursts may toggle from a low number to a high number at a given frequency.

While the data burst module 110 transmits the pattern of bursts to the first application 104A, the covert channel detection module 112 transmits (at 304) probe requests to the second application 104B. In one embodiment, the probe requests are designed to stress the same potential hidden dependency as stressed by the pattern in bursts. Upon transmitting the probe requests to the second application 104B, the covert channel detection module 112 receives (at 306) responses corresponding to the probe requests from the second application 104B. The covert channel detection module 112 then determines (at 308) response times by computing the difference in the times at which the probe requests are transmitted to the second application 104B and the times at which the corresponding responses are received from the second application 104B.

Upon determining the response times, the covert channel detection module 112 determines (at 310) whether the potential hidden dependency exists based on the response times. In one embodiment, the covert channel detection module 112 computes Fourier transforms of the response times in a frequency domain. In this case, the covert channel detection module 112 may analyze the Fourier transforms to determine whether a frequency spike occurs at the given frequency at which the number of concurrent requests toggles from a low number to a high number. If the frequency spike occurs at the given frequency, then the covert channel detection module 112 determines that the potential hidden dependency exists. However, if the frequency spike does not occur at the given frequency, then the covert channel detection module 112 determines that the potential hidden dependency does not exist.

In one embodiment, the magnitude of the burst pattern (e.g., send more bursts in the high phase) may be increased until either a pattern is detected by the probe 114 or until the response time of the burst pattern requests increases beyond a given threshold. If the response times of the burst pattern requests increase to the specified threshold without any pattern seen by the probe 114, then it can be determined that no dependency exists.

Figure 4:
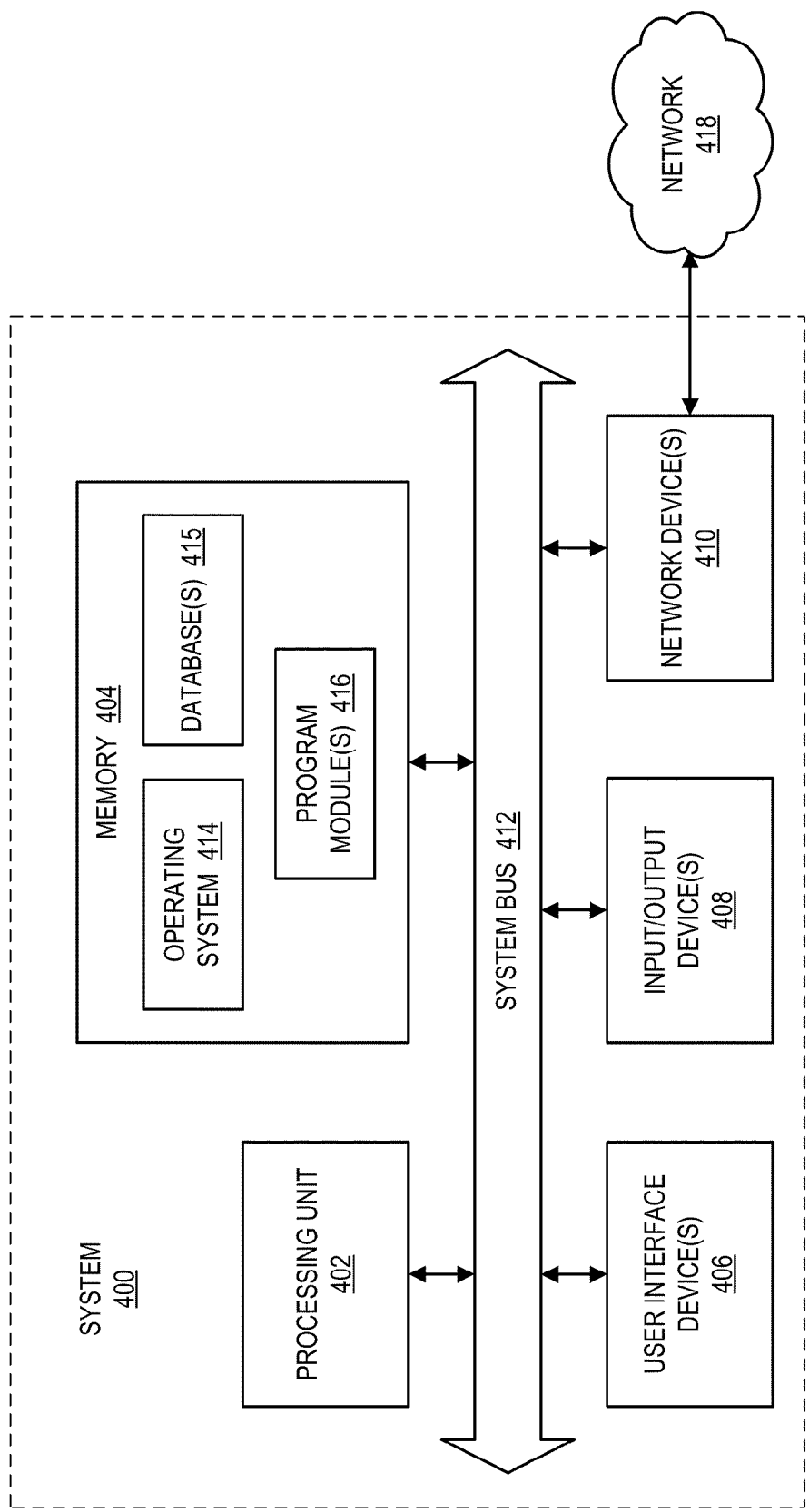
FIG. 4 is a computer architecture diagram showing aspects of an illustrative computer hardware architecture for a computing system capable of implementing aspects of the embodiments presented herein.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a system 400 operative to detect a hidden shared dependency through covert channels, in accordance with exemplary embodiments. The system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410. Examples of the system 400 include, but are not limited to, computers, servers, personal digital assistants, cellular phones, or any suitable computing devices. Examples of computing devices may include the computer 108 and the probe 114.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 414, one or more databases 415, and one or more program modules 416, according to exemplary embodiments. An example of the database 415 may include the database 106. Examples of the program modules 416 may include data burst module 110 and the covert channel detection module 112. In one embodiment, the method 300 for detecting a hidden shared dependency through covert channels as described above with respect to FIG. 3 may be embodied as one of the program modules 416. Examples of operating systems, such as the operating system 414, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 400.

The user interface devices 406 may include one or more devices with which a user accesses the system 400. The user interface devices 406 may include, but are not limited to, computers, servers, personal digital assistants, cellular phones, or any suitable computing devices. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the system 400 to communicate with other networks or remote systems via the network 418. Examples of network devices 410 may include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for detecting a hidden shared dependency through covert channels, comprising:
    transmitting a pattern of bursts to a first application hosted by a first server, the pattern of bursts being designed to stress a potential hidden dependency shared by the first application and a second application hosted by a second server, each of the bursts comprising one or more concurrent requests;
    transmitting probe requests to the second application;
    receiving responses corresponding to the probe requests from the second application;
    determining response times by computing a difference between times that the probe requests are transmitted and times that the corresponding responses are received; and
    determining whether the potential hidden dependency exists based on the response times.

2. The method of claim 1, wherein a number of the concurrent requests in each of the bursts is periodically fluctuated throughout the pattern.

3. The method of claim 2, wherein the number of concurrent requests in each of the bursts is periodically fluctuated according to a square-wave waveform at a given frequency.

4. The method of claim 3, further comprising computing Fourier transforms of the response times in a frequency domain; and wherein determining whether the potential hidden dependency exists based on the response times comprises determining whether the potential hidden dependency exists based on magnitudes of the Fourier transforms.

5. The method of claim 4, wherein determining whether the potential hidden dependency exists based on magnitudes of the Fourier transforms comprises determining that the potential hidden dependency exists upon identifying a spike in one of the magnitudes at the given frequency.

6. The method of claim 1, wherein the potential hidden dependency comprises a network resource coupled to the first server and the second server.

7. The method of claim 1, wherein the first application and the second application comprise web services.

8. A system for detecting a hidden shared dependency through covert channels, comprising:
    a memory for storing a program detecting the hidden shared dependency through covert channels;
    a processor functionally coupled to the memory, the processor being responsive to computer-executable instructions contained in the program and operative to:
        transmit a pattern of bursts to a first application hosted by a first server, the pattern of bursts being designed to stress a potential hidden dependency shared by the first application and a second application hosted by a second server, each of the bursts comprising one or more concurrent requests,
        transmit probe requests to the second application,
        receive responses corresponding to the probe requests from the second application,
        determine response times by computing a difference between times that the probe requests are transmitted and times that the corresponding responses are received, and
        determine whether the potential hidden dependency exists based on the response times.

9. The system of claim 8, wherein a number of the concurrent requests in each of the bursts is periodically fluctuated throughout the pattern.

10. The system of claim 9, wherein the number of concurrent requests in each of the bursts is periodically fluctuated according to a square-wave waveform at a given frequency.

11. The system of claim 10, the processor being responsive to further computer-executable instructions contained in the program and operative to compute Fourier transforms of the response times in a frequency domain; and wherein to determine whether the potential hidden dependency exists based on the response times, the processor is further operative to determine whether the potential hidden dependency exists based on magnitudes of the Fourier transforms.

12. The system of claim 11, wherein determining whether the potential hidden dependency exists based on magnitudes of the Fourier transforms comprises determining that the potential hidden dependency exists upon identifying a spike in one of the magnitudes at the given frequency.

13. The system of claim 8, wherein the potential hidden dependency comprises a network resource coupled to the first server and the second server.

14. A non-transitory computer-readable storage medium having instructions stored thereon for execution by a processor to provide a method for detecting a hidden shared dependency through covert channels, the method comprising:
- transmitting a pattern of bursts to a first application hosted by a first server, the pattern of bursts being designed to stress a potential hidden dependency shared by the first application and a second application hosted by a second server, each of the bursts comprising one or more concurrent requests;
- transmitting probe requests to the second application;
- receiving responses corresponding to the probe requests from the second application;
- determining response times by computing a difference between times that the probe requests are transmitted and times that the corresponding responses are received; and
- determining whether the potential hidden dependency exists based on the response times.

15. The non-transitory computer-readable storage medium of claim 14, wherein a number of the concurrent requests in each of the bursts is periodically fluctuated throughout the pattern.

16. The non-transitory computer-readable storage medium of claim 15, wherein the number of concurrent requests in each of the bursts is periodically fluctuated according to a square-wave waveform at a given frequency.

17. The non-transitory computer-readable storage medium of claim 16, the method further comprising computing Fourier transforms of the response times in a frequency domain; and wherein determining whether the potential hidden dependency exists based on the response times comprises determining whether the potential hidden dependency exists based on magnitudes of the Fourier transforms.

18. The non-transitory computer-readable storage medium of claim 17, wherein determining whether the potential hidden dependency exists based on magnitudes of the Fourier transforms comprises determining that the potential hidden dependency exists upon identifying a spike in one of the magnitudes at the given frequency.

19. The non-transitory computer-readable storage medium of claim 14, wherein the potential hidden dependency comprises a network resource coupled to the first server and the second server.

20. The non-transitory computer-readable storage medium of claim 14, wherein the first application and the second application comprise web services.

* * * * *